(12) United States Patent
Foger

(10) Patent No.: US 7,521,139 B2
(45) Date of Patent: Apr. 21, 2009

(54) THERMAL MANAGEMENT OF FUEL CELLS

(75) Inventor: Karl Foger, Kew (AU)

(73) Assignee: Ceramic Fuel Cells Limited, Victoria (AU)

( * ) Notice: Subject to any disclaimer, the term of this patent is extended or adjusted under 35 U.S.C. 154(b) by 807 days.

(21) Appl. No.: 10/502,957

(22) PCT Filed: Jan. 23, 2003

(86) PCT No.: PCT/AU03/00029

§ 371 (c)(1),
(2), (4) Date: Jul. 29, 2004

(87) PCT Pub. No.: WO03/065488

PCT Pub. Date: Aug. 7, 2003

(65) Prior Publication Data

US 2005/0074642 A1    Apr. 7, 2005

(30) Foreign Application Priority Data

Jan. 31, 2002 (AU) ........................... PS0243

(51) Int. Cl.
*H01M 8/04* (2006.01)
*H01M 8/18* (2006.01)
(52) U.S. Cl. ................. 429/17; 429/20; 429/24
(58) Field of Classification Search ............ 429/17, 429/20, 26, 24
See application file for complete search history.

(56) References Cited

U.S. PATENT DOCUMENTS

| | | | |
|---|---|---|---|
| 4,522,894 A | * | 6/1985 | Hwang et al. ............ 429/17 |
| 5,084,362 A | | 1/1992 | Farooque |
| 5,993,984 A | | 11/1999 | Matsumura et al. |

FOREIGN PATENT DOCUMENTS

| | | |
|---|---|---|
| CA | 2 332 964 A1 | 12/1999 |
| EP | 468698 B1 | 10/1995 |
| GB | 2348315 A | 9/2000 |
| JP | 7-230819 | 8/1995 |
| JP | 7-272741 | 10/1995 |
| JP | 11-25997 | 1/1999 |
| JP | 2000-84410 | 3/2000 |
| JP | 2001-266924 A | 9/2001 |
| WO | WO-01/13452 A1 | 2/2001 |
| WO | WO-02/067351 A1 | 8/2002 |

* cited by examiner

*Primary Examiner*—Patrick Ryan
*Assistant Examiner*—Thomas H. Parsons
(74) *Attorney, Agent, or Firm*—Birch, Stewart, Kolasch & Birch, LLP

(57) ABSTRACT

A method for the thermal management of a fuel cell, which method comprises: processing a fuel supply stream in an autothermal reformer to produce a fuel cell supply stream comprising a concentration of methane; and reforming within the fuel cell methane present in the fuel cell supply stream, wherein the concentration of methane in the fuel cell supply stream is controlled by operation of the autothermal reformer in order to achieve a desired level of reforming of methane within the fuel cell.

12 Claims, 1 Drawing Sheet

THERMAL MANAGEMENT OF FUEL CELLS

CROSS-REFERENCE TO RELATED APPLICATION

The present application claims priority under 35 U.S.C. §119 to Australian Patent Application No. PS 0243/02 filed Jan. 31, 2002, and PCT/AU03/00029 file on Jan. 23, 2003, the contents of which are hereby incorporated by reference.

BACKGROIND OF THE INVENTION

1. Field of the Invention

The present invention relates to a method for the thermal management of a fuel cell and to a fuel cell system which facilitates thermal management of a fuel cell.

2. Description of Background Art

Fuel cells convert gaseous fuels (fuel and oxidant) via an electrochemical process directly into electricity. Generally, the electricity-generating reaction within the fuel cell is exothermic resulting in a temperature increase of the cell. Even though the fuel cell is run at elevated temperature, this temperature increase can reduce fuel cell efficiency and causethermal runaway, and means for cooling the fuel cell are invariably required.

One method of cooling a fuel cell involves the use of a coolant which is circulated in thermal exchange with the cell. Heat absorbed by the coolant is discharged away from the fuel cell, for instance by use of heat exchangers. The coolant may then be recycled to the cell. As an embodiment of this general approach a fuel cell may be cooled by supplying the fuel cell with excess oxidant (e.g. air) than is actually required for power generation, the excess oxidant serving as a coolant. However, this approach requires specific cooling circuitry within the fuel cell system as well as an increase in size of passages within the fuel cell to facilitate adequate coolant flow. This also typically requires the use of large fans/compressors and this can result in increased parasitic losses. These factors result in an increase in the size and complexity of fuel cell systems and an increase in overall expense, particularly where large and/or numerous heat exchangers are called for. Additionally, where the gaseous feed to the fuel cell is used as coolant, the excess flow rate required can lead to pressure losses within the system.

It would be desirable to control the temperature of a fuel cell in a way which does not rely solely on coolant circulation in thermal exchange with the fuel cell. It would be particularly desirable to provide a means for the thermal management of a fuel cell which relies on reactions occurring within the cell itself. This would enable simplified and compact system design, improve efficiency and reduce costs compared with conventional cooling techniques as described.

Traditionally, hydrogen, usually moistened with steam has been used as fuel for low temperature fuel cells. High temperature fuel cells such as molten carbonate fuel cells and solid oxide fuel cells can operate on hydrocarbon fuels, the latter being converted into hydrogen in one or more parts of the fuel cell system. Steam reforming is one well known method for producing hydrogen from hydrocarbon fuels. However, steam reforming is an endothermic reaction and requires heat transfer from other parts of the system which may slow down the reformer response. Also, the steam reforming process requires upstream processing of the feedstock to remove sulfur compounds to prevent poisoning of the reforming catalyst. It would also be desirable to provide a fuel cell system which does not suffer these drawbacks.

SUMMARY AND OBJECTS OF THE INVENTION

Accordingly, the present invention provides a method for the thermal management of a fuel cell, which method comprises:

processing a fuel supply stream in an autothermal reformer to produce a fuel cell supply stream comprising a concentration of methane; and reforming within the fuel cell methane present in the fuel cell supply stream, wherein the concentration of methane in the fuel cell supply stream is controlled by operation of the autothermal reformer in order to achieve a desired level of reforming of methane within the fuel cell.

The electricity-generating reaction in the fuel cell is exothermic, whereas reforming of methane within the fuel cell (also referred to herein as internal reforming) is an endothermic reaction. The present invention relies on using the exothermic reaction to supply energy necessary for the endothermic reaction, thereby achieving thermal management of the fuel cell by reactions occurring within the cell itself. An important aspect of the present invention is the use of an autothermal reformer the operation of which may be varied in order to control the methane concentration in the fuel cell supply stream and thus the amount of methane available for internal reforming within the fuel cell. As the endothermic internal reforming reaction acts as a heat sink for heat produced by the exothermic electricity-generating reaction within the fuel cell, controlling the amount of methane available for internal reforming enables the temperature of the fuel cell to be controlled. In turn this reduces the need to employ the kind of fuel cell cooling systems described above, although in practice smaller scale systems are likely to be employed in conjunction with the method of thermal management in accordance with the present invention. Even though an external heat exchange system is still required, this can be downsized significantly resulting in significant cost and space savings.

Use of an autothermal reformer in practice of the present invention enables the use of a variety of hydrocarbon fuels to be used in the fuel supply stream. Furthermore, it is not essential to carry out desulfurisation of the fuel supply stream prior to its introduction into the autothermal reformer. A desulfurisation unit may however be included downstream of the autothermal reformer in order to process the fuel cell supply stream prior to its introduction into the fuel cell. This is discussed in greater detail below.

A significant advantage of the present invention is that the methane concentration in the output stream of the autothermal reformer may be varied on a continuous and rapid basis thereby allowing the extent of internal reforming of methane within the fuel cell to be controlled in response to fluctuations in fuel cell temperature, such as would occur when the load demand on the fuel cell varies. For instance, as the load demand on the fuel cell increases, so does its temperature due to an increase in the exothermic electricity-generating reaction. In this case the autothermal reformer may be operated so that the resultant fuel cell supply stream has a sufficiently high methane concentration so that internal reforming in the cell takes place to a greater extent, thereby consuming additional heat produced by the exothermic electricity-generating reaction in the cell. Conversely, when the fuel cell is under lower load conditions, the amount of heat produced by the electricity-generating reaction in the fuel cell is less than under higher load conditions. In this case the methane concentration in the fuel cell supply stream may be reduced as less internal reforming of methane is required to consume heat produced by the electricity-generating reaction in the fuel cell. The use of an autothermal reformer, the methane output of which may be continuously adjusted, therefore allows thermal management of the fuel cell by load following.

The present invention also provides a fuel cell system which allows thermal management of a fuel cell, the system comprising:

an autothermal reformer which is capable of variable operation to produce an output stream having controlled methane concentration and which is provided upstream of and in communication with a fuel cell; and a fuel cell which is adapted to reform methane within the fuel cell and which is provided downstream of and in communication with the autothermal reformer.

Further scope applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herin below and the accompanying drawing which is given by way of illustration only, and thus are not limitative of the present invention, and wherein.

DETAILED DESCRIPTION OF THE PREFERRED EMBODIMENTS

Figure 1:
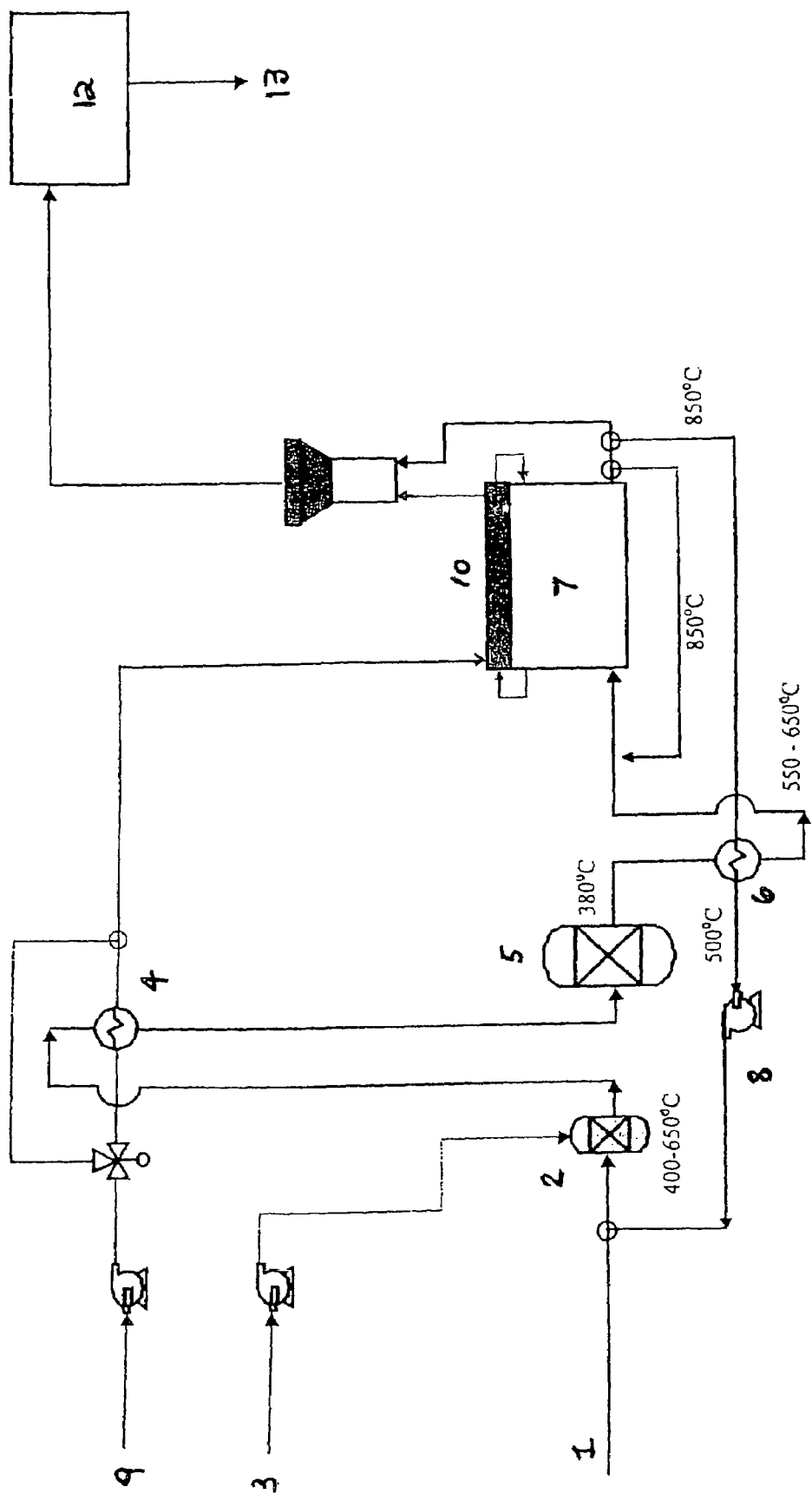
FIG. 1 is a schematic diagram of the fuel cell system of the present invention.

The various components of the fuel cell system are in communication with each other by means of conventional gas supply conduits. These may include ancillary components such as heat exchangers, control valves, manifolds, pumps and condensers, as necessary. The terms "upstream" and "downstream" are intended to reflect the positions of the various components of the system relative to each other. The accompanying figure also illustrates this.

The output stream of the autothermal reformer, i.e. the fuel cell supply stream, includes a concentration of methane which may be varied by operation of the autothermal reformer. It is an important feature of the present invention that the fuel cell supply stream includes sufficient methane to achieve an appropriate level of internal reforming within the fuel cell, thereby achieving desired cooling thereof For instance, to achieve the desired level of cooling, the methane concentration in the fuel cell supply stream must be higher when the fuel cell is operated under high load when compared with the methane concentration in the fuel cell supply stream sufficient for cooling when the fuel cell is under lower load.

Usually, the fuel supply stream will natural gas which is predominantly (typically at least 85% by volume) methane with small quantities of higher hydrocarbons. Higher hydrocarbon fuels such as LPG and diesel may also be used.

It will be appreciated that under high load demand reduced reforming of methane external to the fuel cell is required as more methane is needed for the endothermic methane internal reforming reaction within the fuel cell: for heat removal therefrom. At low load, more methane reforming external to the fuel cell is called for the fuel cell to be thermally self-sustaining as less methane is then required for reforming within the fuel cell.

The autothermal reformer combines catalytic partial oxidation and steam reforming reactions. The catalytic partial oxidation provides the heat for the endothermic (steam) reforming reaction.

The catalytic partial oxidation usually takes place in a first catalytic zone over a catalyst suitable for catalytic oxidation of the fuel supply stream. Typically, the catalyst comprises platinum, palladium or rhodium, preferably platinum and palladium, provided on a refractory metal oxide such as alumina, supported on a monolithic body. Useful catalysts supports and autothermal reforming reactors are known in the art and are commercially available. Desirably, the catalyst used to effect catalytic partial oxidation is effective in the presence of sulfur compounds. The temperature of this first catalytic zone is typically 400 degrees C. to 900degrees C.

The steam reforming catalyst of the autothermal reformer is typically provided in a second catalyst zone. The catalyst used for the steam reforming reaction may comprise any of the catalytic metals known to be useful for steam reforming, such as nickel, cobalt, platinum and ruthenium and mixtures thereof. The catalyst may be used in the form of a particulate bed or supported on an inert carrier support, as mentioned above for the partial oxidation catalyst.

The following equations summarise the catalytic partial oxidation and steam reforming of methane (reactions 1-3) and higher hydrocarbons ($C_xH_y$) (reactions 4-6):

$$CH_4 + O_2 \rightarrow CO_2 + H_2O \quad (1) \text{ Combustion}$$

$$CH_4 + \tfrac{1}{2}O_2 \rightarrow CO + 2H_2 \quad (2) \text{ Partial oxidation}$$

$$CH_4 + H_2O \rightarrow 3H_2 + CO \quad (3) \text{ Steam reforming}$$

$$C_xH_y + (2x+y/2)O_2 \rightarrow xCO_2 + y/2 H_2O \quad (4) \text{ Combustion}$$

$$C_xH_y + x/yO_2 \rightarrow xCO + y/2 H_2 \quad (5) \text{ Partial oxidation}$$

$$C_xH_y + H_2O \rightarrow CH_4 + CO + H_2 \quad (6) \text{ Steam reforming}$$

$$CO + H_2O \rightarrow H_2 + CO_2 \quad (7)$$

Reaction (7) is the water-gas shift reaction which is normally at equilibrium.

In an embodiment of the invention the catalysts for the partial oxidation and steam reforming reactions are present in a single reaction zone within the vessel used for autothermal reforming.

It will be appreciated from the equations given above that the way in which the autothermal reformer is operated will depend upon the nature of the hydrocarbon fuel supply stream and on the desired methane content of the fuel cell supply stream. The latter is of course directly related to the load demand on the fuel cell. Thus, if the fuel supply stream is natural gas, under high fuel cell load, the autothermal reformer is operated in such a way so as to result in reforming essentially only higher hydrocarbons. The result is maximum methane concentration in the fuel cell supply stream and thus maximum capacity for internal reforming and cell cooling. In contrast, when the fuel supply stream is natural gas and the cooling requirements of the cell are low, such as on start-up or where the cell is under low load, the autothermal reformer is operated to achieve significant methane reforming and therefore reduced methane concentration in the fuel cell supply stream. To achieve this the reformer aspect of the autothermal reformer may be operated at high temperature.

When the fuel supply stream is predominantly made up of higher hydrocarbons, such as when diesel is used as the fuel, the reformer aspect of the autothermal reformer may be operated at relatively low temperature (typically below 550degrees C.) to produce methane from the higher hydrocarbons. The concentration of methane in the fuel cell supply stream may be controlled by controlling the temperature of the reformer aspect of the autothermal reformer In an embodiment of the invention the extent of catalytic partial oxidation is controlled by adjusting the amount of oxygen available for the reaction. As air is usually used as the oxygen supply, this may be done by controlling the air flow rate over, and thus the oxygen supply to, the catalyst for partial oxidation. This may be achieved by adjusting an air blower which is typically used to supply air to the autothermal reformer. Based on the carbon content of the fuel supply, the oxygen to carbon ratio (by mass) is usually adjusted to be in the range 0.1 to 0.7.

The extent of steam reforming in the autothermal reformer may be adjusted by controlling the steam to carbon ratio in the fuel supply stream. This may be achieved, for instance, by adjusting the amount of water (in the form of steam) available for reaction. In part this may be achieved by manipulating the partial oxidation reaction as water is a product thereof. However, usually steam is also supplied to the autothermal reformer from the anode exhaust stream of the fuel cell. Therefore, the amount of steam to the autothermal reformer may additionally, or alternatively, be varied by controlling recycling of the anode waste stream. It may also be possible to control the extent of steam reforming by using an autothermal reformer which includes a (steam reforming) catalyst whose activity varies with the steam to carbon ratio in the fuel supply stream.

It may also be possible to manipulate the methane concentration in the output of the autothermal reformer by adjusting the temperature and/or pressure at which the autothermal reformer is operated. The operating temperature is typically 300 to 900 degrees C., preferably 400 to 800 degrees C. The pressure is usually from 1 to 10, preferably, from 1 to 5, atmospheres.

In general terms, these methods of controlling the operation of the autothermal reformer rely on reactant concentration effects and/or the residence time of reactants in the fuel supply stream over the catalysts in the autothermal reformer. The same effect may be achieved by controlling the surface area of catalyst in contact with the fuel supply stream. Thus, one or more catalysts in the autothermal reformer may be provided with a series of catalyst-coated or uncoated channels configured in such a way that the fuel supply stream may be caused to flow through selected channels based upon the required degree of contact between the fuel supply stream and catalyst in the autothermal reformer, thereby controlling the methane concentration in the fuel cell feed stream.

In another embodiment the autothermal reformer includes a (partial oxidation) catalyst whose activity varies with the oxygen to carbon ratio in the fuel supply stream. Suitable catalysts include active materials which are noble group metals. A gadolinium-doped ceria catalyst may be used and such are commercially available. Typically the oxygen to carbon ratio (by mass) is between 0.2 and 0.7. The lower end of this ratio corresponds to just reforming higher hydrocarbons present in the fuel supply stream. The upper end of this ratio represents approximately 75% reforming where most of the hydrocarbons are converted to hydrogen and carbon monoxide.

In practice a number of different methods may be employed in combination to achieve the desired control in the output of the autothermal reformer.

The methane concentration of the fuel cell supply stream will be varied in order to achieve thermal management of the fuel cell. Generally, to achieve adequate cooling under conditions of maximum cell load, the methane content of the fuel cell supply stream will be at least 10% by volume, preferably at least 15% by volume, measured on a wet basis. Lower concentrations of methane will suffice when the cell is operated as less than full load. These volumes take into account that in operating an autothermal reformer some nitrogen dilution takes place. Very high levels of methane in the fuel cell supply stream have the potential to cause excessive cooling as a result of the endothermic reforming reaction. This problem is particularly likely to be encountered in a wholly ceramic solid oxide fuel cell due to the low thermal conductivity of ceramic materials, but can be alleviated by incorporating metal or metallic components in the fuel cell stack, for example as the gas separators between under adjacent fuel cells, to improve thermal conductivity across the stack. Alternatively, or in addition, other means may be provided to alleviate excessive cooling of each fuel cell assembly, including pre-heating of the fuel cell supply stream.

Methane present in the fuel cell supply stream is reformed within the fuel cell. Reformation typically takes place at the anode of the cell, and the anode is suitably adapted to catalyse the reforming reaction. Thus, the anode may comprise a nickel material, such as a nickel/zirconia cermet, to catalyse the methane reforming reaction. It is also possible to use nickel on magnesium oxide or nickel on alumina. The reforming catalyst may be provided in fuel flow channels within the anode side of the fuel cell.

On start up of the system there is no steam available for reforming in the autothermal reformer. Initially therefore the autothermal reformer is run dry as a partial oxidation reactor. Some steam may be introduced externally, though this is not essential. As steam is generated by the partial oxidation reaction, reforming in the autothermal reformer may proceed. When the fuel cell is operative, steam may also be returned to the autothermal reformer from the anode exhaust stream.

In the present invention the methane concentration in the fuel cell supply stream is adjusted based on the temperature of the fuel cell, the temperature varying with load demand. Control may involve measurement of the fuel cell temperature with appropriate adjustment of the autothermal reformer with consequential impact on the extent of endothermic reforming within the cell and thermal management thereof. In this way the temperature of the fuel cell may be optimised for a given load demand. Typically, the base line running temperature of the fuel cell will be about 800-850 degrees C.

It is also possible to achieve cell cooling using the kind of conventional coolant-based techniques described above, and this may be particularly appropriate if the temperature of the fuel cell spikes suddenly. However, reliance on such techniques will be diminished by practice of the invention in which the reactions within the fuel cell are advantageously self-sustaining, primarily at low load. This means that ancillary cooling systems, if needed, may be simplified and reduced in size. The present invention aims to provide a rapidly responsive means of thermally managing a fuel cell which also enables suitably rapid load following.

The fuel cell and its associated assembly can take any suitable form. Preferably the fuel cell operates at a temperature which is sufficient to provide essentially substantial conversion of the methane in the internal reforming reaction. This maximises the efficiency of the thermal management system.

Preferably, the reforming catalyst provided in the fuel cell has capacity to reform the maximum methane concentration likely to be provided to the fuel cell during operation thereof. This also contributes to the efficiency of the fuel cell system of the present invention.

Depending upon the sulfur content of the fuel supply stream and thus of the fuel cell supply stream, it may be appropriate to include a desulfuriser unit to remove sulfur-containing compounds from the fuel cell supply stream prior to its introduction to the fuel cell. Hydrogen sulfide and organic sulfur-containing compounds present in the fuel cell supply stream can cause poisoning of the catalyst used for internal reforming in the fuel cell. A conventional desulfuriser unit may be employed consisting of a hydrogenation catalyst such as Co—Mo to convert sulfur-containing compounds to hydrogen sulfide, and a hydrogen sulfide adsorbent bed, such as zinc oxide. The hydrogenation catalyst requires a continuous supply of hydrogen in order to affectively convert sulfur-containing compounds to hydrogen sulfide. The desulfurisation unit would be operated under conventional operating conditions. Prior to delivery of the fuel cell supply stream to the fuel cell the sulfur content of the stream is typically reduced to a level of less than about 1 part per million by weight, and preferably to less than 0.2 parts per million by weight.

When used, the input temperature for the desulfuriser unit is typically lower than the exit temperature of the autothermal reformer. This being the case the output stream of the autothermal reformer may be cooled prior to delivery to the desulfuriser unit. Moreover, the exit temperature of the desulfuriser unit is typically significantly lower than the input temperature required for the fuel cell. In this case the output stream of the desulfuriser unit is pre-heated prior to delivery to the fuel cell.

The fuel cell supply stream is delivered to the anode of the fuel cell by conventional means. Pre-heated oxidant, typically air, is fed to the cathode of the fuel cell. Exhaust gases of the fuel cell may be processed using a catalytic oxidiser. Advantageously, steam may be provided to the autothermal reformer and/or the fuel cell (for internal reforming) by recycling of the anode exhaust stream. The anode exhaust stream may be returned to and mixed with the fuel supply stream for the autothermal reformer using a hot gas blower.

Generally, the fuel cell to which the fuel stream is supplied will be one of multiple fuel cells to which the fuel stream is also supplied, commonly called a fuel cell stack in the case of planar SOFCs. However, the invention also extends to the process being performed using a single fuel cell. By way of example only, several different planar SOFC components and systems, SOFCs and materials are described in our International Patent Applications Ser. Nos. PCT/AU96/00140, PCT/AU96/00594, PCT/AU98/00437, PCT/AU98/00719 and PCT/AU98/00956, the contents of which are incorporated herein by reference, including the corresponding U.S. Pat. No. 5,942,349 and patent applications Ser. Nos. 09/155061 (now U.S. Pat. No. 6,280,828 ), 09/445735 (now U.S. Pat. No. 6,492,053), 09/486501 (now U.S. Pat. No. 6,444,340), and 09/554709 (now U.S. Pat. No. 6,294,131), respectively. Other disclosures appear in our International patent applications Ser. No. PCT/AU99/01140, PCT/AU00/00630 and PCT/AU00/631.

The present invention is illustrated in the accompanying non-limiting FIG. 1 which shows schematically an embodiment of a fuel cell system in accordance with the present invention. More particularly, the figure shows a fuel supply stream (1), being delivered to an autothermal reformer (2). Prior to delivery to the autothermal reformer (2) the fuel supply stream (1) is heated (not shown). In the autothermal reformer (2) the fuel supply stream (1) is subjected to a catalytic partial oxidation and steam reformation thereby producing a fuel cell supply stream having a concentration of methane. Air (3) as oxidant is also supplied to the autothermal reformer (2) using a hot air blower in order to achieve catalytic partial oxidation of the fuel supply stream. Initially, the autothermal reformer (2) is run dry as no steam is available to it. In the embodiment shown the autothermal reformer (2) is operated at a temperature of 400-650degrees C. The fuel cell supply stream exiting the autothermal reformer (2) is then cooled using a cooler (4) before being fed to a desulfuriser unit (5) operating at approximately 380degrees C. The desulfuriser unit (5) includes a hydrogenation catalyst, to convert organic sulfur containing compounds present in the fuel cell supply stream into hydrogen sulfide, and a hydrogen sulfide adsorbent bed, typically Zn0. The desulfurised fuel cell supply stream is then pre-heated to a temperature of 550-650degrees C. using a fuel pre-heater (6) and delivered to the anode (7) of a fuel cell. Although not shown in the figure, the fuel cell is a fuel cell stack comprising multiple fuel cells. Anode exhaust may be recirculated to the autothermal reformer (2) using a hot air blower (8). The exhaust stream from the fuel cell anode (7) and cathode (10) is fed to a waste heat recovery unit (12) to give a final exhaust stream (13).

Air (9) is fed via a hot air blower to the cathode (10) of the fuel cell. Within the fuel cell electricity is generated by an exothermic reaction. At the anode (7) methane present in the fuel cell supply stream is internally reformed by an endothermic reaction, the heat necessary for the reaction being supplied by the exothermic electricity-generating reaction occurring within the fuel cell. A control unit (not shown) measures the temperature of the fuel cell and varies the operation of the autothermal reformer such that the methane concentration in the fuel cell supply stream is adjusted to a suitable level so that internal reforming of methane within the fuel cell takes place at an appropriate extent to allow control of the fuel cell temperature. If the load demand on the fuel cell increases, so will its temperature. In this case the autothermal reformer (2) is operated in order to provide increased methane in the fuel cell supply stream and thus increased internal reforming in the fuel cell. The consequential increase in endothermic reforming reaction within the cell consumes additional heat generated by the fuel cell. When the load demand on fuel cell falls, so does its temperature and the autothermal reforming operation is adjusted to reduce the methane concentration in the fuel cell supply stream commensurate with the amount of methane required for the level of internal reforming needed to consume heat produced by the electricity-generating reaction within the fuel cell.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention being thus described, it will be obvious to the same may be varied in many ways Such variations are not to be regarded as a departure from the spirit and scope of the invention, and all such modifications as would be obvious to one skilled in the art are intended to be included within the scope of the following claims.

The invention claimed is:

1. A method for the thermal management of a fuel cell, which method comprises: processing a fuel supply stream in an autothermal reformer to produce a fuel cell supply stream comprising a concentration of methane; and reforming within the fuel cell methane present in the fuel cell supply stream, wherein the concentration of methane in the fuel cell supply stream is controlled by operation of the autothermal reformer in order to achieve a desired level of reforming of methane within the fuel cell.

2. A method according to claim 1, wherein the methane concentration in the output stream of the autothermal reformer may be varied on a continuous and rapid basis thereby allowing the extent of internal reforming of methane within the fuel cell to be controlled in response to fluctuations in fuel cell temperature.

3. A method according to claim 1, wherein the fuel supply stream is natural gas, LPG or diesel.

4. A method according to claim 1, wherein the autothermal reformer combines catalytic partial oxidation and steam reforming reactions.

5. A method according to claim 4, wherein the concentration of methane in the fuel cell supply stream is controlled by controlling the temperature of the reformer aspect of the autothermal reformer.

6. A method according to claim 4, wherein the extent of catalytic partial oxidation is controlled by adjusting the amount of oxygen available for the reaction.

7. A method according to claim 4, wherein the extent of steam reforming in the autothermal reformer is adjusted by controlling the amount of water available for reaction.

8. A method according to claim 1, wherein the methane concentration in the output of the autothermal reformer is controlled by adjusting the temperature and/or pressure at which the autothermal reformer is operated.

9. A method according to claim 1, wherein the autothermal reformer is provided with a series of catalyst-coated and uncoated channels configured in such a way that the fuel supply stream may be caused to flow through selected channels based upon the required degree of contact between the fuel supply stream and catalyst in the autothermal reformer, thereby controlling the methane concentration in the fuel cell feed stream.

10. A method according to claim 1, wherein the autothermal reformer includes a catalyst whose activity varies with the oxygen to carbon ratio in the fuel supply stream.

11. A method according to claim 1, wherein the methane concentration of the fuel cell supply stream is at least 10% by volume.

12. A fuel cell system which allows thermal management of a fuel cell, comprising:

an autothermal reformer configured to produce an output stream having controlled methane concentration provided upstream of and in communication with a fuel cell;

a fuel cell configured to internally reform methane provided downstream of and in communication with the autothermal reform; and a control unit configured to measure a temperature of said fuel cell and to vary the operation of the autothermal reformer in order to control concentration of the methane in an output stream of the autothermal reformer during operation of the autothermal reformer so that the internal reforming of the methane within the fuel cell takes place at an appropriate level to control the temperature of the fuel cell.

* * * * *